(12) United States Patent
Linde

(10) Patent No.: US 10,624,269 B1
(45) Date of Patent: Apr. 21, 2020

(54) UNLOADING SYSTEM FOR AGRICULTURAL COMBINE

(71) Applicant: CNH Industrial America LLC, New Holland, PA (US)

(72) Inventor: Karl Linde, Leola, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/289,916

(22) Filed: Mar. 1, 2019

(51) Int. Cl.
*A01D 90/10* (2006.01)
*B65G 67/24* (2006.01)

(52) U.S. Cl.
CPC ............. *A01D 90/10* (2013.01); *B65G 67/24* (2013.01); *B65G 2814/0326* (2013.01)

(58) Field of Classification Search
CPC ................................ A01D 90/10; B65G 67/24
See application file for complete search history.

(56) References Cited

U.S. PATENT DOCUMENTS

| 5,733,094 | A | 3/1998 | Bergkamp et al. |
| 6,606,844 | B2 | 8/2003 | Dillon et al. |
| 9,033,643 | B1 | 5/2015 | Kile |
| 9,049,817 | B2 | 6/2015 | McCully et al. |
| 9,901,030 | B2 | 2/2018 | Matousek et al. |
| 9,961,835 | B2 | 5/2018 | Lauwers et al. |
| 2018/0160624 | A1 | 6/2018 | Ducroquet et al. |

*Primary Examiner* — Jonathan Snelting
(74) *Attorney, Agent, or Firm* — Peter K. Zacharias; Patrick M. Sheldrake

(57) ABSTRACT

A system for unloading a grain storage tank of a combine harvester includes a conduit that is sized to extend into an interior region of the grain storage tank. The conduit defines an interior space that is sized to receive an auger that is configured to remove the grain from the grain storage tank. The conduit further defines an opening for receiving grain from the interior region of the grain storage tank. A panel is positioned adjacent the opening in the conduit. The panel is movable between a first position in which the panel at least partially conceals the opening to meter the entrance of grain through the opening, and a second position in which the panel does not conceal the opening to freely permit the entrance of grain through the opening and into the conduit.

20 Claims, 6 Drawing Sheets

US 10,624,269 B1

UNLOADING SYSTEM FOR AGRICULTURAL COMBINE

FIELD OF THE INVENTION

The present subject matter relates generally to harvesters, such as combine harvesters, and more particularly to methods and systems to control an unload drive system during unloading of the combine harvester.

BACKGROUND OF THE INVENTION

As is described in U.S. Pat. No. 9,961,835, which is incorporated by reference herein in its entirety, during operation of a combine harvester, grain is distributed from a cleaning system of the combine to a storage tank within the combine. Grain is distributed to a sump or other area in the grain tank by cross augers that are arranged in the storage tank. A vertical auger located at the sump unloads the grain from the grain tank. That grain is conveyed to a support trailer, truck, or grain cart alongside the combine. A moveable tent is positioned over each cross-auger to meter the amount of grain that is removed from the tank to match a user's desired unload rate and reduce torque load.

The cross augers typically remain active over the entirety of the unloading operation, which can occur simultaneously with other operations, including threshing and cleaning. Accordingly, operation of the cross augers reduces the power of the combine that is available for completing those other operations.

SUMMARY OF THE INVENTION

It is not necessary to operate the cross augers over the entirety of the unloading operation because, depending upon the level of grain in the tank and the inclination of the combine, gravity alone can deliver the grain to the sump of the tank. Because it is still necessary to meter the grain, a moveable door positioned adjacent the vertical auger is provided. The door is movable to meter the amount of grain that is delivered to the vertical auger, and is ultimately conveyed to the support trailer, truck, or grain cart alongside the combine.

According to one aspect of the invention, a system for unloading a grain storage tank of a combine harvester includes a conduit that is sized to extend into an interior region of the grain storage tank. The conduit defines an interior space that is sized to receive an auger that is configured to remove the grain from the grain storage tank. The conduit further defines an opening for receiving grain from the interior region of the grain storage tank. A panel is positioned adjacent the opening in the conduit. The panel is movable between a first position in which the panel conceals the opening to prevent the entrance of grain through the opening, and a second position in which the panel does not conceal the opening to freely permit the entrance of grain through the opening and into the conduit. A controller is configured to actively adjust the panel to positions located between the first and second positions during a grain unloading operation in order to meter the entrance of grain through the opening The system comprises a sensor that is configured to determine a level of grain within the storage tank, and, when the determined level of grain exceeds a pre-determined value, the system is configured to (i) deactivate an auger in the storage tank, and (ii) move the panel between the first position and the second position to meter the volume of grain expelled from the conduit. When the determined level of grain falls below the pre-determined value, the system is configured to (i) activate an auger in the storage tank to deliver grain toward the opening of the conduit, and (ii) move the panel between the first position and the second position to meter the volume of grain expelled from the conduit.

According to another aspect of the invention, a combine harvester includes the aforementioned system.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Figure 1:
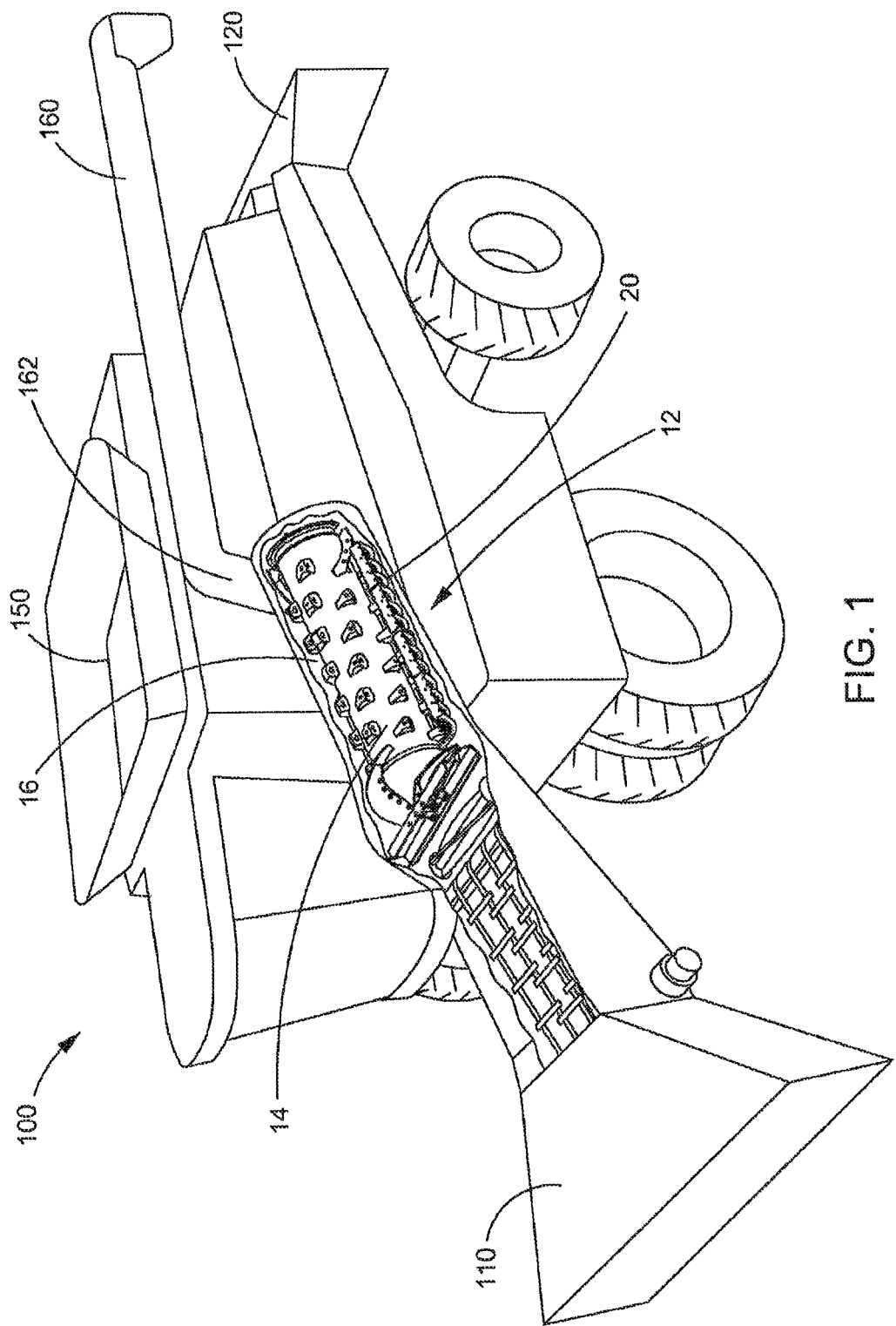
FIG. 1 illustrates a perspective view of an exemplary combine for use with embodiments described herein.

Corresponding reference characters indicate corresponding parts throughout the several views. The exemplification set out herein illustrates an embodiment of the invention, in one form, and such exemplification is not to be construed as limiting the scope of the invention in any manner.

The terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Referring now to the drawings, as is described in U.S. Pat. No. 9,961,835, FIG. 1 through FIGS. 3A and 3B show exemplary agricultural combines in which exemplary embodiments described herein may be implemented. FIG. 1 shows an exemplary agricultural combine 100, which may also be referred as a combine or harvester throughout this specification. As shown in FIG. 1, the combine 100 can include header 110, a longitudinally arranged threshing and separation system 12, and a concave 20 within the threshing and separation system 12. The threshing mechanism may also be of any well-known construction and operation. In some embodiments, the concave 20 may also be used with combines having transversely aligned threshing and separation system in a combine.

As shown, threshing and separation system 12 is longitudinally arranged, in that it includes a cylindrical threshing rotor 14 conventionally supported and rotatable in a predetermined direction about a rotational axis therethrough for conveying a flow of crop material in a helical flow path through a threshing chamber 16 that extends circumferentially around the rotor 14. As shown, concave 20 may extend circumferentially around the rotor 14 and the flow of crop may pass in the space between the spinning rotor and the concaves. As the crop material flows through the threshing and separation system 12, the crop material including, for example, grain, straw, legumes, and the like, will be loosened and separated from crop residue or material other than grain (MOG) such as, for example, husks, cobs, pods, and the like, and the separated materials may be carried away from the threshing and separation system 12 in a well-known conventional manner. Crop residue can be redistributed to the field via a spreader 120, located at, for example, the back of the harvester.

Figure 2:
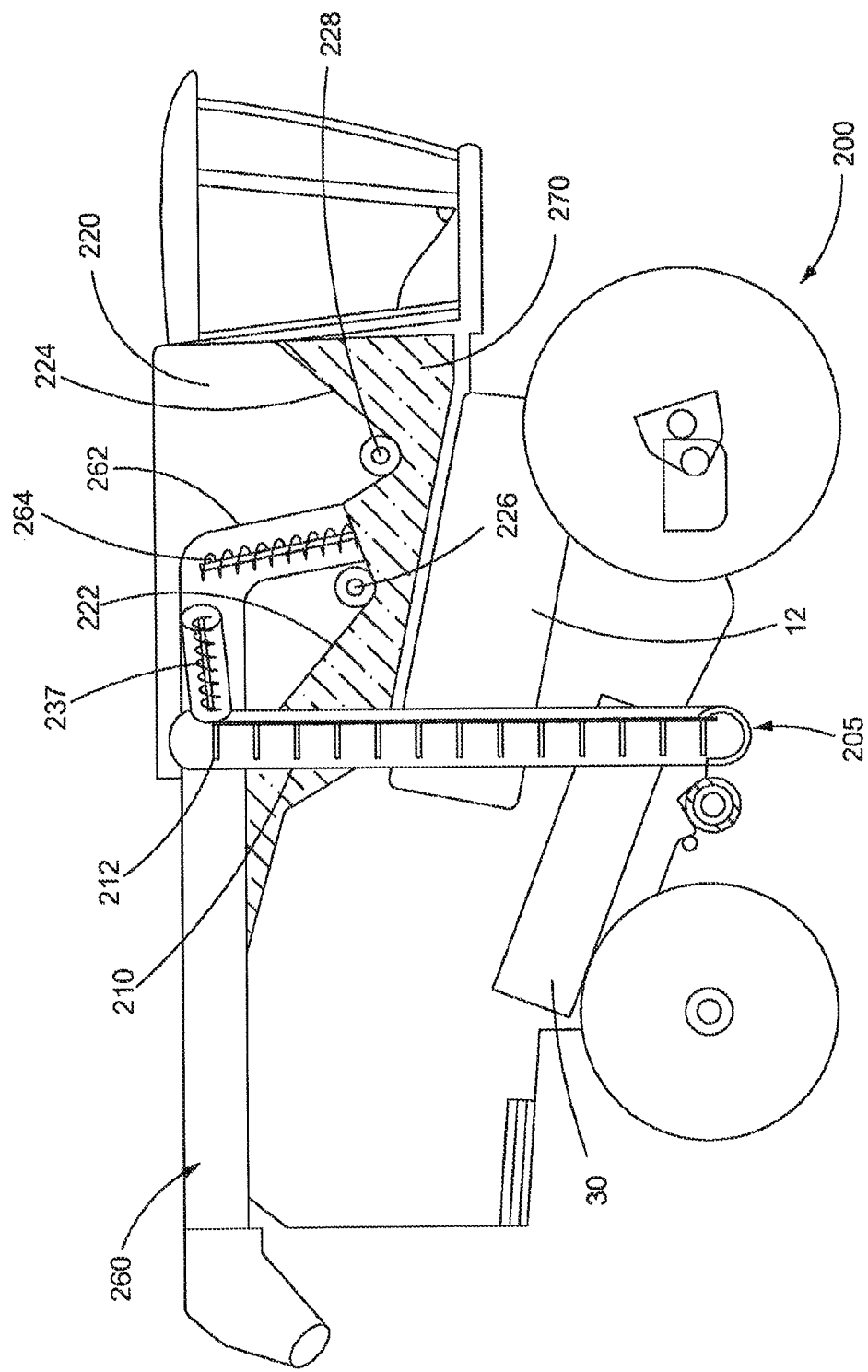
FIG. 2 illustrates a side view of an exemplary combine for use with embodiments described herein.
Figure 3A:
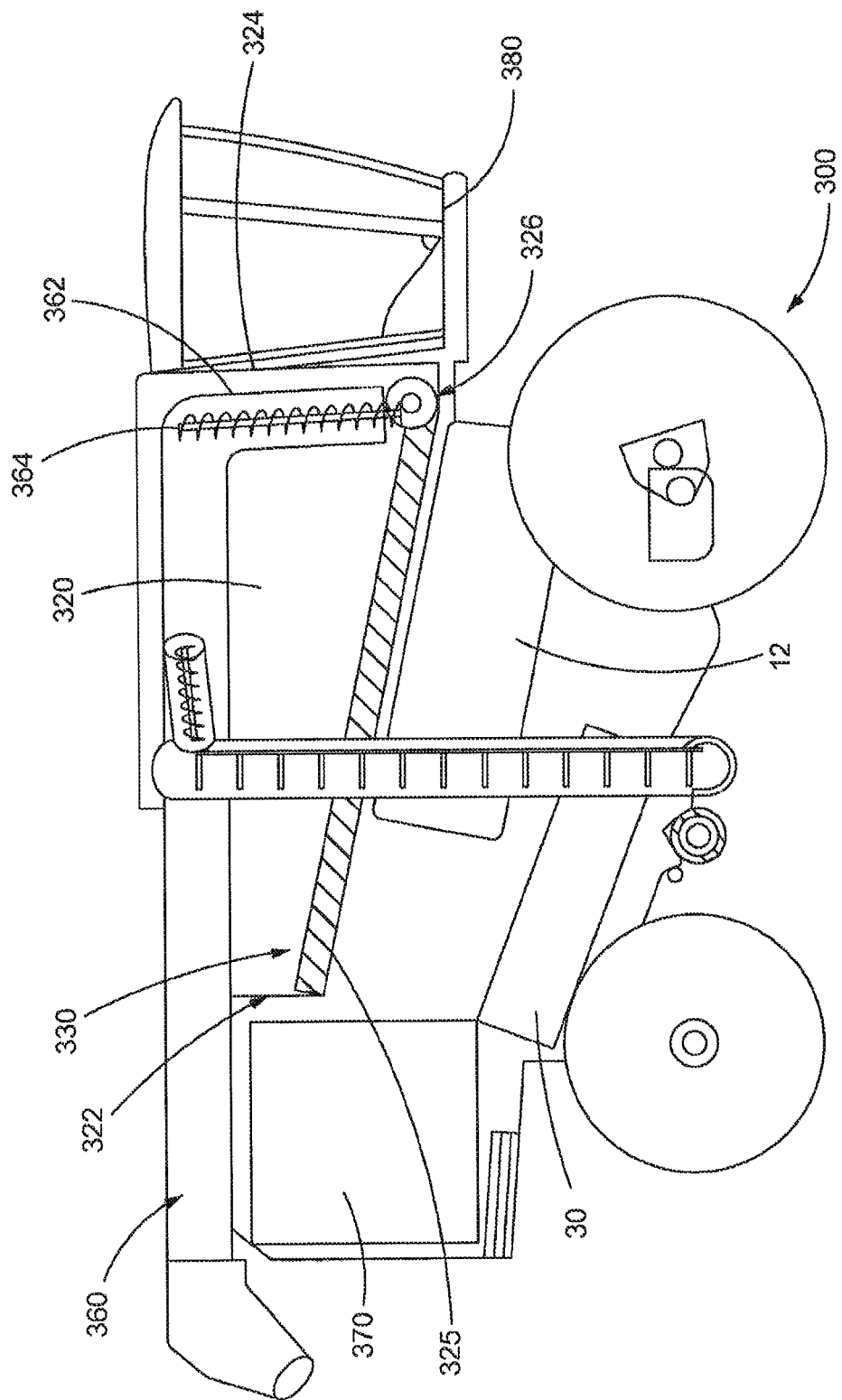
FIG. 3A illustrates a side view of another exemplary combine for use with embodiments described herein.

The remaining threshed crop, which includes the grain to be collected, is then cleaned via a cleaning system shown at FIG. 1, FIG. 2 and FIG. 3A. The cleaning system can include conventional winnowing mechanisms including a fan that blows air across a series of reciprocating sieves. Through the winnowing action of the air and the reciprocating sieves, clean grain may be collected and sorted from the remaining chaff. The clean grain may be conveyed to the grain tank 150 via a cross auger that conveys grain laterally from the bottom of the cleaning system to a vertical conveyor (or elevator) that conveys grain up a load tube to be spilled into grain tank 150. At the bottom of grain tank 150, one or more grain tank augers (such as cross augers) move grain laterally from the bottom of the grain tank 150 to vertical tube 162 (also referred to herein as a vertical conduit) of unload tube 160 representing a turret style system of offloading. Vertical tube 162 may include a single unload conveying auger or multiple unload conveying augers, such as an auger for propelling grain up and to another auger within the unload tube 160. Unload tube 160 may be rotated such that it may extend its full length laterally for unloading grain from the grain tank 150 to a support vehicle, such as a truck that is driving along the side of the combine 100. Unload tube 160 may also be oriented to the rear for storage, as shown.

FIG. 2 shows a transparent cross-sectional view of an exemplary agricultural combine 200 including a grain tank 220 with multiple cross augers 226 and 228 which may be used with embodiments described herein. Crop is threshed via threshing system 12. The threshed crop is then cleaned via the cleaning system 30. The surface in cleaning system 30 separates out clean grain which collects along the path of the bottom of the cleaning system at cross auger 205. The cross auger 205 moves the clean grain laterally to an elevator 210 which includes a paddle chain lift 212. The paddle chain lift 212, having paddles that are uniformly spaced along the chain to lift grain, conveys the grain upward to a dispenser auger 237 that discharges the grain into the grain tank 220.

In this arrangement of grain tank 220 shown in FIG. 2, sloping side walls 222 and 224 are sloped such that as grain accumulates in the grain tank 220 as conveyed from dispenser auger 237, the grain naturally slides down to cross augers 226 and 228. These side walls 222 and 224 are sloped at such an angle that they convene at the bottom of the tank 220 to form the 'W' shaped floor bottom, as shown. Grain tank cross augers 226 and 228 convey the accumulated grain laterally so that it may be collected into vertical tube 262 which includes an unload conveying vertical auger 264 that propels the grain upward. This allows grain to be moved into an unload vehicle via unload tube 260, which may include another unload conveying internal auger and may rotate about a pivot coextensive with vertical tube 262. Non-storable grain volume 270 is identified by slash marks in FIG. 2 to show space effectively unusable between the grain tank, and the threshing system 12 due to the geometry of the sloped sides 222 and 224 forming the floor of the grain tank 220.

FIG. 3A shows a transparent cross-sectional view of another exemplary agricultural combine 300 with a single grain tank cross auger 326 which may be used. As shown in FIG. 3A, combine 300 may include an engine 370, cab 380 and a grain tank 320. Grain tank 320 includes vertical side walls 322 and 324 and generally flat bottom 325. Along the bottom 325 of grain tank 320, a conveyance system 330 is placed.

Bottom 325 includes an active conveying system 330 such that grain tank 320 need not rely on gravity to feed grain into the cross auger. Conveyance system 330, in some embodiments, conveys collected grain forward in the grain tank 320 to a single grain tank cross auger 326. Cross auger 326 then conveys the grain laterally to be collected by vertical tube 362, which includes a vertical unload conveying auger 364 to propel the grain upward. This sends grain into an unload tube 360, which may include another unload conveying auger (not shown). It should be understood that the vertical auger 364 could be provided in the form of an elevation having a paddle chain lift, like the lift 212. Thus, the vertical auger 364 may also be referred to herein as a vertical grain conveyance device.

Figure 3B:
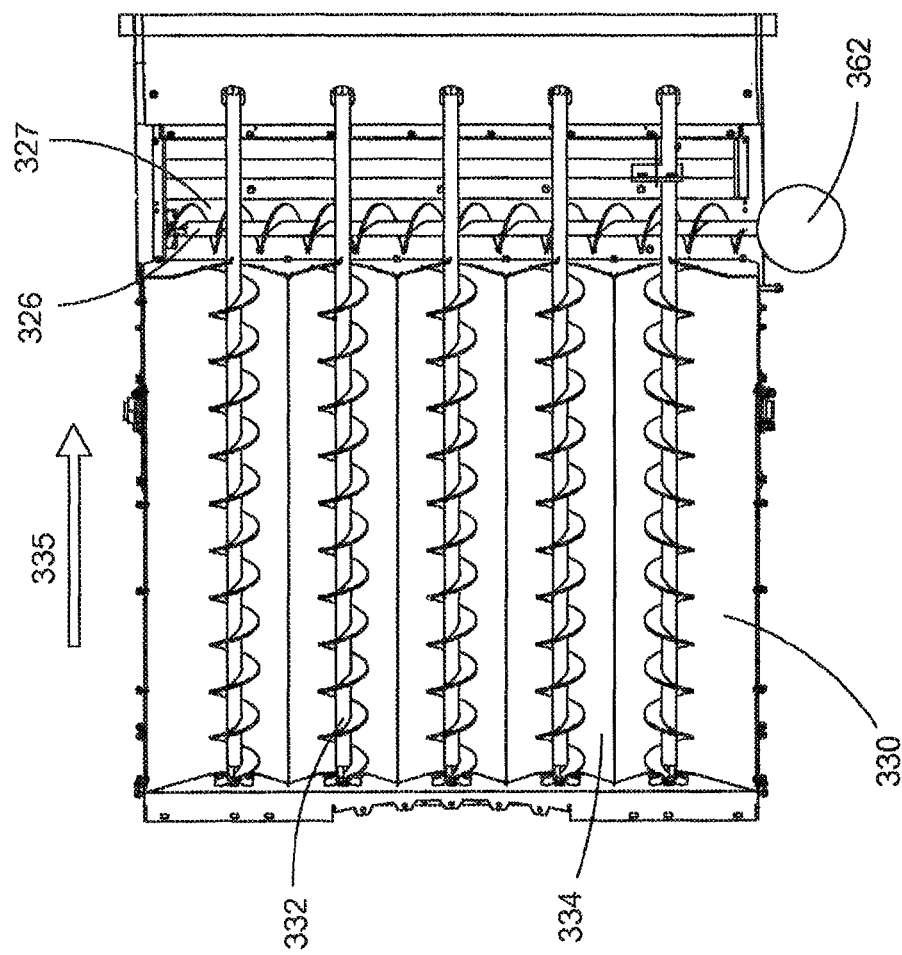
FIG. 3B illustrates a top plan view of the base of the grain storage tank of the combine of FIG. 3A.

FIG. 3B is a top view of the exemplary conveyance system 330, shown at FIG. 3A, in which exemplary embodiments described herein may be implemented. This embodiment of conveyance system 330 comprises an auger bed. Grain tank augers 332 sit in troughs 334 and rotate to convey grain in direction 335. When grain reaches grain tank cross auger 326, grain tank cross auger 326 conveys the grain in a transverse direction so that it may be conveyed to vertical tube 362. As shown, grain tank cross auger 326 rests in trough 327. The trough 327 may be sloped in a direction that is perpendicular to arrow 335 such that the grain moves toward the tube 362 under gravity.

Traditionally, grain is conveyed in direction 335, left to right which is from the rear of the combine to the front of the combine. In some embodiments, the grain may be conveyed in a right to left direction. In other embodiments, grain may be conveyed from an outside to center direction, if for instance the grain tank cross auger 326 and vertical tube 362 were more centrally located in the conveyance system 330 or depending on other design considerations in locating the grain tank cross auger 326 and vertical tube 362. Location of the grain tank cross auger 326 or vertical tube 362 may necessitate the location of grain tank augers 332 in the auger bed, the on and off sequencing of the grain tank augers 332, and/or the rotational speed, size, pitch, or diameter of the grain tank augers 332 to effectuate conveyance of grain through the conveyance system 330. Augers 332 and 326 may be driven by a conventional manner known to a person of ordinary skill or, such as motors, gears, belts, chains, direct mechanical drives, and the like.

As is described in greater detail in U.S. Pat. No. 9,961, 835, the conveyance system 330 may also include slotted or perforated covers (also referred to as tents) for selectively covering the grain tank cross auger 326. The covers are selectively movable with respect to the grain tank cross auger 326 for metering the amount of grain delivered to the vertical tube 362. The metered amount of grain delivered by grain tank cross auger 326 to the vertical tube 362 defines, at least in part, the unload rate of the combine.

As noted above, augers 332 and 326 typically remain active over the entirety of the unloading operation, which can occur simultaneously with other operations of the combine. During harvesting, considerable amounts of power are consumed to perform different activities, such as harvesting, unloading grain into a grain cart, and moving the combine on the ground. Accordingly, different combine systems demand horsepower for their respective functions. The demand may depend on many factors. For example, the unload system may demand more horsepower for a grain that does not flow as easy other grains.

Constant operation of the augers 332 and 326 over the entirety of the unloading operation reduces the power of the combine that is available for completing those other operations. However, it is not always necessary to operate the augers 332 and 326 over the entirety of the unloading operation because, depending upon the level of grain in the tank and the inclination (tilt) of the combine, gravity alone can deliver the grain to the sump of the tank and vertical tube 362. Deactivating the augers 332 and/or 326 over at least a portion of the unloading operation can result in a significant savings in horsepower, and the horsepower may then be used for the aforementioned operations, as required.

If the augers 332 and/or 326 are deactivated during the unloading operation, then it is still necessary to meter the amount of grain that is delivered through the vertical tube 362. The arrangements shown in FIGS. 4A-5B address the need for metering the proper amount of grain that is delivered to the vertical tube 362 during the unloading operation while the augers 332 and/or 326 are deactivated. It should be understood that the auger covers, which ordinarily perform the metering function, are ineffective for metering while the augers 332 and/or 326 are deactivated.

Figure 4A:
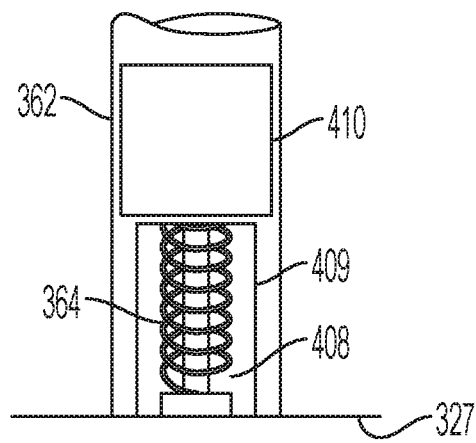
FIGS. 4A and 4B illustrate a side view of an arrangement for metering grain to be expelled from the combine.
Figure 4B:
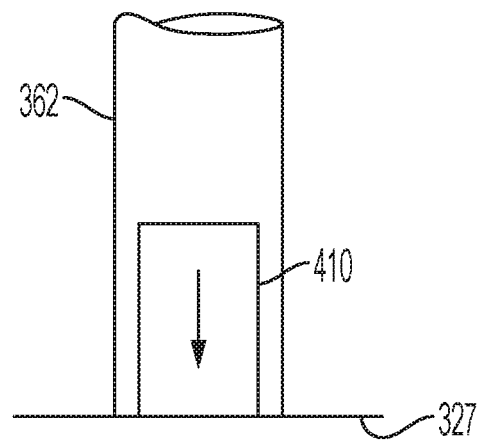
Figure 4C:
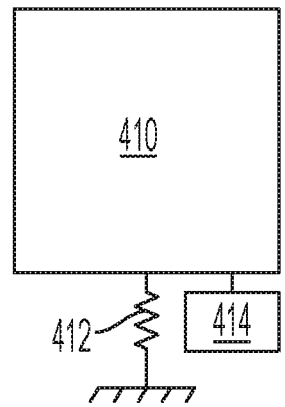
FIG. 4C illustrates a system for controlling movement of the arrangement of FIGS. 4A and 4B.

According to the arrangement shown in FIGS. 4A-4C, the base end of the tube 362 includes an opening 409. The opening 409 may be rectangular, as shown, or any other shape. The opening 409 provides a passage to the interior region 408 of the tube 362. The base end of the tube 362 may be mounted to the trough 327, as shown, or, alternatively, the base end of the tube 362 may be mounted to a surface of the grain tank, for example. A moveable panel 410 is mounted at the base end of the vertical tube 362 for selectively concealing the opening 409, as will be described hereinafter.

The panel 410 is configured to move vertically up and down (as depicted by the arrow in FIG. 4B). In the 'up' position shown in FIG. 4A, the panel 410 completely exposes the opening 409 to permit a maximum flow of grain into the interior region 408 of the tube 362, which is ultimately carried upward by the vertical unload conveying auger 364. In the 'down' position shown in FIG. 4B, the panel 410 conceals the opening 409 to prevent the flow of grain into the interior region 408 of the tube 362. The panel 410 is movable to various positions between the up and down positions that are shown while the augers 332 and/or 326 are deactivated. It should be understood that when the augers 332 and/or 326 are activated, the panel 410 is typically in the 'up' position to permit the entrance of grain into the interior region 408 of the tube 362.

FIG. 4C is a block diagram depicting a system for controlling movement of the panel 410. The panel 410 may be connected to a spring 412 for biasing the panel 410 to the 'up' position, for example. An actuator 414 translates the panel 410 downward against the bias of the spring 412 to the 'down' position. The actuator 414 may be any actuator that is known in the art, such as a linear actuator, worm screws, motors (e.g., electric motor), hydraulic cylinders, or a drive system that is connected to a power transmission system of the combine by a clutch.

Figure 5A:
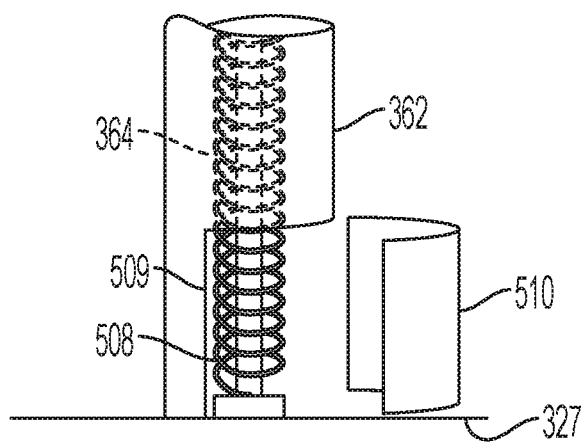
FIGS. 5A and 5B illustrate a side view of another arrangement for metering grain to be expelled from the combine.
Figure 5B:
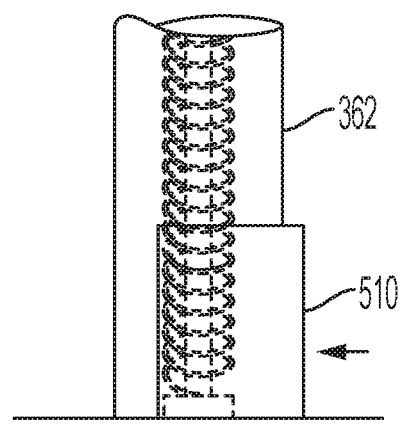

According to the arrangement shown in FIGS. 5A and 5B, the base end of the tube 362 includes an opening 509. The opening 509 may extend about a portion of the perimeter of the tube 362, as shown. Alternatively, the opening 509 may take another shape. The opening 509 provides a passage to the interior region 508 of the tube 362. The base end of the tube 362 may be mounted to the trough 327, as shown, or, alternatively, the base end of the tube 362 may be mounted to a surface of the grain tank, for example. A moveable panel 510 is mounted at the base end of the vertical tube 362 for selectively concealing the opening 509, as will be described hereinafter.

The panel 510 is configured to move horizontally in a transverse direction (as depicted by the arrow in FIG. 5B) between a deployed position (FIG. 5A) and a retracted position (FIG. 5B). In the deployed position shown in FIG. 5A, the panel 510 completely exposes the opening 509 to permit a maximum flow of grain into the interior region 508 of the tube 362, which is ultimately carried upward by the vertical unload conveying auger 364. In the retracted position shown in FIG. 5B, the panel 510 conceals the opening 509 to prevent the flow of grain into the interior region 508 of the tube 362. The panel 510 is movable to various positions between the deployed and retracted positions that are shown while the cross augers 326 are deactivated. It should be understood that when the augers 332 and/or 326 are activated, the panel 510 is typically in the deployed position to permit the entrance of grain into the interior region 508 of the tube 362. Although not shown, the panel 510 may be moved by an actuator against the bias of a spring, like the panel 410.

In another embodiment, the panel is pivotably connected to the tube 362 for selectively exposing an opening formed in the tube 362.

The position of the panels 410 and 510 relative to their openings 409 and 509, respectively, influences the unload rate of the combine. Unload rates may be controlled based on, for example, the fill level of the grain tank of the combine, and the fill level of the tank of the support trailer, truck, or grain cart moving alongside the combine. Unload rates may also be controlled based on the type of grain in the grain tank of the combine.

The augers 332 and 326 may be activated to propel the grain towards the tube 362 either (i) when the grain tank of the combine is nearly empty, or (ii) when the combine is tilted to such a degree that the grain does not move toward the tube 362 under gravity. At such time, the panels 410 and 510 are positioned such that their openings 409 and 509, respectively, are open, exposed and ready to receive grain into the tube 362.

Figure 6:
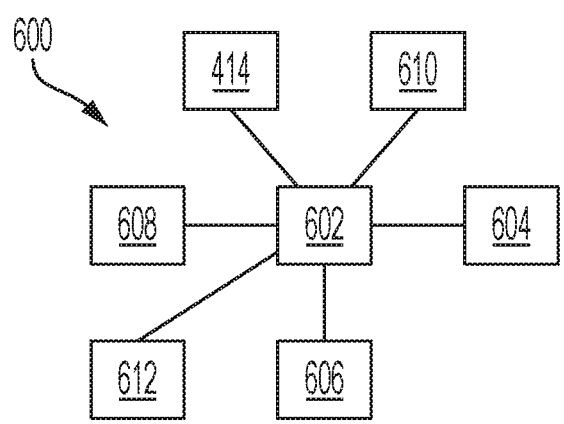
FIG. 6 is a block diagram illustrating an exemplary combine unload control system for an unload system for use with embodiments described herein.

FIG. 6 is a block diagram illustrating an exemplary combine unload control system 600 for an unload system for use with embodiments described herein. The control system 600 may include a controller 602 that is configured to meter the amount of grain introduced into the vertical tube 362. The controller 602 is connected to at least the following components: an actuator 414 that is configured to move the panel 410/510; one or more sensors 604 that are configured to sense the fill level of the grain tank of the combine; one or more sensors 606 that are configured to sense the tilt/orientation of the grain tank of the combine; a sensor 612 for sensing the position of the panel 410/510; a user interface 610 for controlling the system 600; and/or one or more sensors 608 that are configured to sense the fill level of the tank of the support trailer, truck, or grain cart moving alongside the combine. Sensors 604 and 608 may be optical sensors. Sensor 606 may be an accelerometer. It should be understood that the system 600 is not limited to the above described components, and various components of the system 600 may be omitted, if so desired.

Based upon the signals received from the sensors 604, 606 and 608, the controller 602 is configured to actively operate the actuator 414 to move the panel 410/510 to a calculated position with respect to the opening in the tube 362 in order to meter the amount of grain introduced into the vertical tube 362. Controller 602 may also meter the amount of grain based on horsepower demand in the unload system and other systems of the combine.

Controller 602 may also be connected to the system for controlling operation of the augers 332 and 326. More particularly, controller 602 may be configured to deactivate the augers 332 and 326 during the unloading operation when the sensors 604 and 606 determine that a sufficient volume of grain can reach the tube 362 by gravity, and activate the augers 332 and 326 during the unloading operation when the sensors 604 and 606 determine that the grain tank is nearly empty or a sufficient volume of grain cannot reach the tube 362 by gravity due to tilting of the combine.

Although not shown, controller 602 may be connected to a sensor 612 that is configured to sense the position of the panel 410/510, and determine whether the panel 410/510 has either moved to its expected position or has failed to reach its expected position.

Additional conditions for metering the amount of grain are described in greater detail in U.S. Pat. No. 9,961,835. The system 600 is also configured to adjust the position of the auger covers (not shown) based upon various conditions, as is also described in greater detail in U.S. Pat. No. 9,961,835.

It is to be understood that the operational steps are performed by the controller 602 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 602 described herein is implemented in software code or instructions which are tangibly stored on a tangible computer readable medium. Upon loading and executing such software code or instructions by the controller 602, the controller 602 may perform any of the functionality of the controller 602 described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A combine harvester comprising:
   a storage tank defining an interior region for holding grain;
   a conduit extending into the interior region of the storage tank, said conduit defining an interior space that is sized to receive a vertically oriented grain conveyance device that is configured to remove the grain from the storage tank, said conduit defining an opening for receiving grain from the interior region of the storage tank;
   a panel that is positioned adjacent the opening in the conduit, said panel being movable between a first position in which the panel conceals the opening to prevent entrance of grain through the opening and into the conduit, and a second position in which the panel does not conceal the opening to freely permit the entrance of grain through the opening and into the conduit; and
   a controller that is configured to actively adjust the panel to positions between the first and second positions during a grain unloading operation in order to meter the entrance of grain through the opening.

2. The combine harvester of claim 1 further comprising a sensor that is connected to the controller and is configured to sense a level of grain within the storage tank, and, when the sensed level of grain exceeds a pre-determined value, the system is configured to (i) deactivate an auger in the storage tank, and (ii) move the panel between the first position and the second position to meter the volume of grain expelled from the conduit.

3. The combine harvester of claim 2, wherein when the sensed level of grain falls below the pre-determined value, the system is configured to (i) activate the auger in the storage tank to deliver grain toward the opening of the conduit, and (ii) move the panel toward the second position.

4. The combine harvester of claim 1 further comprising an actuator for moving the panel between the first position and the second position.

5. The combine harvester of claim 1, further comprising a spring mounted to the panel for biasing the panel towards the second position.

6. The combine harvester of claim 1, wherein the opening is at an end of the conduit that is positioned closest to the storage tank.

7. The combine harvester of claim 1, wherein the conduit extends along a first axis, and the panel is moveable in a direction that is parallel to the first axis.

8. The combine harvester of claim 1, wherein the conduit extends along a first axis, and the panel is moveable in a direction that is substantially perpendicular to the first axis.

9. The combine harvester of claim 1, wherein the conduit is configured to swivel between the first position and the second position.

10. The combine harvester of claim 1, further comprising the vertical grain conveyance device positioned within the conduit.

11. A system for unloading a grain storage tank of a combine harvester, said system comprising:

a conduit that is sized to extend into an interior region of the grain storage tank, said conduit defining an interior space that is sized to receive a vertically oriented grain conveyance device configured to remove the grain from the grain storage tank, said conduit defining an opening for receiving grain from the interior region of the grain storage tank;

a panel that is positioned adjacent the opening in the conduit, said panel being movable between a first position in which the panel conceals the opening to prevent entrance of grain through the opening and into the conduit, and a second position in which the panel does not conceal the opening to freely permit the entrance of grain through the opening and into the conduit; and a controller that is configured to actively adjust the panel to positions between the first and second positions during a grain unloading operation in order to meter the entrance of grain through the opening.

12. The system of claim 11, wherein the system comprises a sensor that is connected to the controller and is configured to sense a level of grain within the storage tank, and, when the sensed level of grain exceeds a pre-determined value, the system is configured to (i) deactivate an auger in the storage tank, and (ii) move the panel between the first position and the second position to meter the volume of grain expelled from the conduit.

13. The system of claim 12, wherein when the sensed level of grain falls below the pre-determined value, the system is configured to (i) activate the auger in the storage tank to deliver grain toward the opening of the conduit, and (ii) move the panel toward the second position.

14. The system of claim 11 further comprising an actuator for moving the panel between the first position and the second position.

15. The system of claim 11, further comprising a spring mounted to the panel for biasing the panel towards the second position.

16. The system of claim 11, wherein the opening is at an end of the conduit that is positioned closest to the storage tank.

17. The system of claim 11, wherein the conduit extends along a first axis, and the panel is moveable in a direction that is parallel to the first axis.

18. The system of claim 11, wherein the conduit extends along a first axis, and the panel is moveable in a direction that is substantially perpendicular to the first axis.

19. The system of claim 11, wherein the conduit is configured to swivel between the first position and the second position.

20. The system of claim 11, further comprising the vertical grain conveyance device positioned within the conduit.

* * * * *